United States Patent [19]

Sundermeyer

[11] Patent Number: 5,050,818
[45] Date of Patent: Sep. 24, 1991

[54] METHOD FOR THE REPULSING OF AIRBORNE OBJECTS

[75] Inventor: Peter Sundermeyer, Lauf, Fed. Rep. of Germany

[73] Assignee: Diehl GmbH & Co., Nuremberg, Fed. Rep. of Germany

[21] Appl. No.: 321,663

[22] Filed: Mar. 2, 1989

[51] Int. Cl.⁵ .............................................. F41G 7/30
[52] U.S. Cl. .................................................. 244/3.15
[58] Field of Search ............................. 244/3.11, 3.15

[56] References Cited

U.S. PATENT DOCUMENTS 4,641,801  2/1987  Lynch, Jr. et al. ................. 244/3.11

FOREIGN PATENT DOCUMENTS 0122718  10/1984  European Pat. Off. .
3238293   4/1984  Fed. Rep. of Germany .
3435634   4/1986  Fed. Rep. of Germany .

Primary Examiner—Richard W. Wendtland
Attorney, Agent, or Firm—Scully, Scott, Murphy & Presser

[57] ABSTRACT

A method for the warding-off of flying or airborne objects through the intermediary of guidable defensive airborne bodies. The defensive airborne bodies are launched from the surroundings about the target area which is to be protected; triggered by means of a stationary data transfer device, into a nominal trajectory which, at the latest at a previously specified ideal collision point along the approach trajectory of the target object which is to be intercepted at still a considerable distance, enters approximately tangentially into that particular trajectory. For this purpose, such nominal trajectory is provisionally determined by the ground station pursuant to the constructionally specified dynamics of flight of the defensive airborne body, and the measured or, respectively, extrapolated trajectory of the approaching flying object.

7 Claims, 2 Drawing Sheets

1

METHOD FOR THE REPULSING OF AIRBORNE OBJECTS

BACKGROUND OF THE INVENTION

1. Field of the Invention

The present invention relates to a method for the warding-off of flying or airborne objects through the intermediary of guidable defensive airborne bodies.

2. Discussion of the Prior Art

A method of the type referred to hereinabove is known from the disclosure of U.S. Pat. No. 4,171,818 as the directional-beam guidance method, which is employed in order to be able to intercept airborne objects in the form of aircraft through the use of defensive airborne bodies in the form of remote-controlled rockets. However, in the event that the speed of approach of the airborne object which is to be warded-off relative to the ground-fixed remote-control station; and wherever possible additionally the speed of the defensive airborne body itself; in essence, the relative speed of approach between the airborne object and the defensive airborne body, is high or even extremely high, there is then encountered the considerable danger that, after even only a transient exit of the airborne object from the guide beam, the airborne body, possibly already relatively closely conducted to the airborne object; can no longer implement in an aerodynamically stable manner the necessary severe changes in course in order, still be able to strike the airborne object even after re-acquisition by means of the guiding beam; in essence, the defensive airborne body, without the desired defensive effect, misses the airborne object. The danger of such a malfunction is all the greater when the attacking airborne object, for reasons of protecting the target area, is to be intercepted and rendered harmless at the greatest possible distance of the target from the defensive airborne body, inasmuch as, on the one hand, at very great distances, there is a grater probability that the defensive airborne body will deviate from the cross-section of the guiding beam due to disruptive influences from the surroundings and is no longer able to be influenced from the ground station; whereas, on the other hand, at great distances of the airborne object the unavoidable spreading of the beam can lead to such a large beam cross-section that a precise collision guidance or homing onto a comparatively relatively small airborne object is subject to considerable technological difficulties. Finally, it is also generally disadvantageous that a defensive airborne body which is steered through a guide beam, can be placed out of action before it comes into effect against the airborne object onto which it is home, when the airborne object is able, even after its acquisition by the guide beam, to damage the radiating source thereof; in effect, the fixed remote-control station, and to thereby eliminate the danger encountered in the form of the approaching defensive airborne body; for which there exist basically good prospects, since also the attack against the ground station can be orientated to the guide beam projected therefrom. Since a defensive airborne body, as a rule for the avoidance of extreme fluctuating moments of the guide beam, can be guided towards only a specified airborne object, there is encountered the considerable danger thus exists that at least one object from a group of airborne objects attacking in formation will destroy the station emanating the guide beam, as a consequence, at least a few further ones of the airborne objects will actually reach their intended target area.

SUMMARY OF THE INVENTION

In recognition of these factors, it is accordingly an object of the invention to develop a method of the type described herein that with a greater degree of probability there is ensured, at a considerable range from the target area, an optimum effectiveness of the defensive airborne body in the attacking flying object prior to the latter being able to attack the target area or the surroundings thereabout; especially when consideration is given to kinematic conditions, as are in existence, when there are employed for defense against flying objects, defensive airborne bodies travelling at several times supersonic speed against the attacking flying objects, the latter of which, for example, steeply approach a target area at similarly several times supersonic speed; descending or dropping almost perpendicularly along a somewhat high ballistic trajectory.

Pursuant to the invention, the foregoing object is essentially attained in that the method of the type described herein is employed for defense against flying objects through the intermediary of guidable defensive airborne bodies.

In accordance with the invention, defensive airborne bodies are launched from the surroundings about the target area which is to be protected; triggered by means of a stationary data transfer device, into a nominal trajectory which, at the latest at a previously specified ideal collision point along the approach trajectory of the target object which is to be intercepted at still a considerable distance, enters approximately tangentially into that particular trajectory. For this purpose, such nominal trajectory is provisionally determined by the ground station pursuant to the constructionally specified dynamics of flight of the defensive airborne body, and the measured or, respectively, extrapolated trajectory of the approaching flying object. During the approach to the flying object; especially when there can be determined on board the defensive airborne body due to a reduced distance, the relative position thereof with regard to the flying object which is to be intercepted, taking into consideration these actually given target offset data on the basis of a dynamic projectile model of the nominal trajectory-kinematics are simulated in a time-staggered manner in four-dimensional (space-time) navigation, in order to determine the actually expected point of collision in accordance with spatial point in time, and to determine the deviation from the ideal point of collision. When the extent of the deviation between the, in fact, actually to be expected and the previously-determined optimum point of collision is too great for achieving the intended effect of the defensive warhead in the target object, then the time-lapse or staggered model computation; during the further approach of the airborne body to the object and with consideration given to its actual displacement bearing; is recomputed with trajectory parameters which are modified for this time-lapse simulation; until navigational specifications are found which promise an adequate optimization of the expected collision in accordance with the point in space and point in time. Only then is there actually carried out an applicable correction of the intercepting trajectory for the defensive airborne body; so that until then there will be avoided any, and possibly useless, maneuvers, which only expend time and energy and can conceivably lead to unstable conditions of flight due to ultimately excessively severe course maneuvering requirements. Connected with such hit prediction are further such time-lapse trajectory simulations which, if necessary, again lead to actual steering or guidance interventions or changes, and so forth. In any event, as a result there is achieved an optimum approach to the ideal point of collision, inasmuch as during the time-lapse simulation computation with the actual position-finding data also the actual (previous) influence of all predeterminable trajectory disturbances has been ascertained; and thus can then still be ruled out or compensated.

For the ground station, which need only to initiate the launching of a defensive airborne body with prerequisite of the ideal point of collision and of the provisional four-dimensional nominal course pursuant to the approach kinematics of the flying object which is to be warded-off, recourse may be had to the technology relating to target data computers of which a typical example is described in German OS 32 38 293. The iteratively operating simulation computer basically represents a (hierarchically subordinated) flight regulator which, on the basis of a specified control-technology model of the flight behavior of the defensive airborne body, taking into consideration the nominal trajectory specified at the launching and the subsequently continually ascertained relative displacement from the flying object, determines in the time-lapse or staggered procedure the trajectory and thereby the point of collision which is actually to be expected. The magnitudes of the conditions applied for achieving an optimum simulation result are then specified as reference values in the actual autopilot-flight regulator. With regard to the function of such a superordinated flight regulator; which in accordance with the present invention is designed to follow in flight the four-dimensional trajectory-reference values pursuant to the optimized simulation result; can similarly have recourse to technologies which are known per se; for example, as in European OS 122 718.

Particularly, in the case of a flying object incoming at a very high and steep trajectory, atmospheric friction phenomena lead to an intense thermal radiation, which is expedient for the mode of operation of a passive infrared target tracking device of the defensive airborne body; and regarding with a preferred exemplary embodiment is described in applicant's earlier German Patent Application P 34 35 634.7.

BRIEF DESCRIPTION OF THE DRAWINGS

Additional alternatives and modifications, as well as further features and advantages of the invention will now become more readily apparent from the description of a preferred embodiment thereof, taken in conjunction with the accompanying drawings; in which.

DETAILED DESCRIPTION

Figure 1:
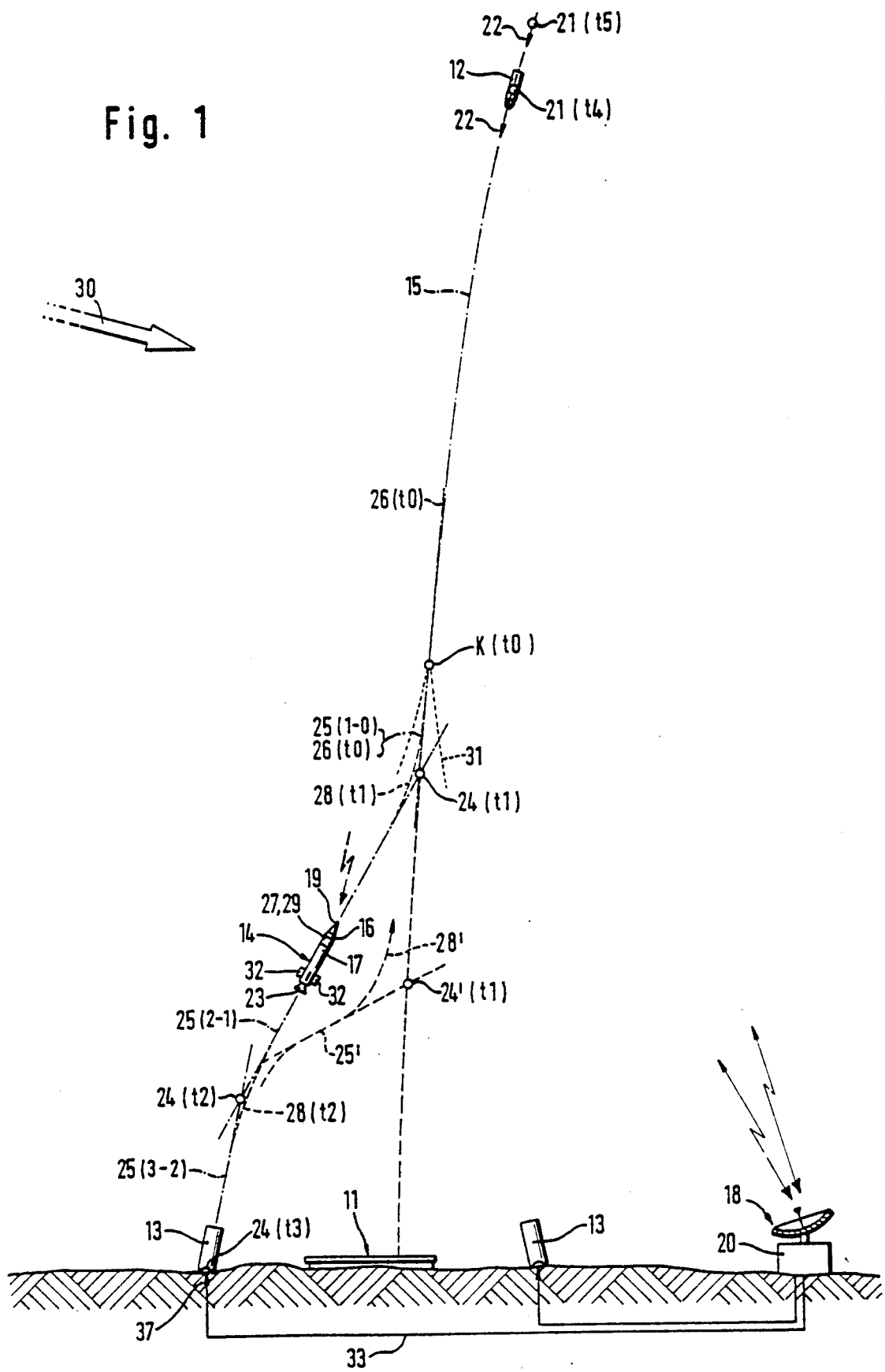
FIG. 1 illustrates in a horizontal projection representative trajectories for the approach of a defensive airborne body to a four-dimensionally predetermined optimum collision point with an oncoming flying object.

In order to protect a potential target area 11 against attack from flying objects 12, launching sites 13 for defensive airborne bodies 14 are positioned in the surroundings of the target area which, if possible, fly against the flying object 12 along its approach trajectory 15 and attempt to destroy the latter at the greatest possible distance from the target area 11 at a collision point K; whereby, in practice, a sufficiently close approximation to theoretically ideal collision point K would be adequate in order to be able, by means of a proximity fuze 16, to detonate a fragmentation warhead 17 of the defensive airborne body 14, for carrying out the destruction of functionally essential components of the oncoming flying object 12.

The fact of the approach of a flying object 12 which is to be warded-off is hereby detected by means of a ground-based radar station 18, the latter of which can be installed at some considerable distance from the target area 11, and consequently, at a distance which still lies far outside the position-finding range of a target-tracking device 19 contained in the flying body 14. A navigational computer 20 which is located in or, in any case, cooperates with the radar station 18 determines the approaching trajectory 15 of the flying object 12 from a sequence of spatial points 21 and motion vectors 22 at a series of successive time points t (in FIG. 1, for simplification of the representation, only two time points t5, t4 are show).

In the interest of obtaining a high-performance and operationally reliable propulsion mechanism for the defensive airborne body 14, there is preferably eliminated any control over the propulsion mechanism [in effect, any influence over the longitudinal or axial velocity of the defensive airborne body 14 through a thrust variation). Due to mechanical reasons, such a defensive airborne body 14 cannot perform suitable course maneuvers, since a superimposition of the acceleration forces which result from the launch acceleration and gravitational forces together with the centrifugal forces encountered during changes in course, can readily lead to an overstressing of the mechanical systems and/or to unstable behavior in flight. Consequently, taking into consideration the launch orientation, there can be computed for the defensive airborne body 14 a nominal trajectory in relation to the ascertained approach trajectory 15 for the flying object 12 which is to be warded-off, in which there is ensured a still adequate distance from the occurrence of limiting values of the effective accelerating forces, such that after the launch to be able to still implement course corrections; in essence, in none of the flight phases of the defensive airborne body 14 will there be excessed the constructional limiting stresses thereof.

Under the burden of such a nominal path, in relation to the approach trajectory 15 which is extrapolated through the navigational computer 20, and with consideration given to the available time-dependent propulsive power output, there can thus be mathematically predetermined an ideal collision point K(t0) between the defensive airborne body 14 and the flying object 12 with respect to its spatial positional coordinates and the time point t0 commencing from the start of the mission of the defensive airborne body 14 (time point t3 in FIG. 1).

While a closed mathematical determination of a variable, uninterrupted polygonal course would entail quite considerable expenditures with respect to the flight controller computer (see below) which is to be installed on board the defensive airborne body 14 and the requirement thereof for computation time, within the scope of the present object it would be adequate to define the mentioned nominal trajectory through the definition of a sequence of relatively few travel points 24, which are successively collected by means of the defensive airborne body 14 in the spatial coordinate system, in which there interest linear rough trajectory elements 25. In the presence of conditions pursuant to the exemplified representation of FIG. 1, the nominal trajectory which is initially specified with the launch, along which the defensive airborne body 14 would reach the ideal collision point K at the point in time t0, is thereby approximated through the sequence of the following travel points 24 (and thus of coarse trajectory elements 25 connected therewith):

The first coarse trajectory element 25 (3-2) is given through the possibly variable firing orientation of the launching site 13; the following second coarse trajectory element 25 (2-1) serves for the course correction in the direction of a travel point 24 (t1) located ahead of the envisioned collision point K(t0), along the approach trajectory 15;

the third coarse trajectory element 23 (1-0), and in this exemplified case the last one specified at launch, under the ideal conditions initially to be specified for purposes of simplification, is identical with the trajectory tangents 26 (t0) through the ideal collision point K(t0).

That particular collision point K(t0) as regards the course maneuvers of the defense airborne body 14, accordingly does not serve the function of a path or travel point, but rather the function of a so-called target point; in essence, of course point which should be actually reached, and thereby a specific approaching flight orientation; namely in the direction of the trajectory tangent 26 but opposite to the direction of the motion vector 22 for the flying object.

However, the course points lying in time ahead thereof; in effect, the path or travel points 24, are only transiently approached during the flight along the rough trajectory elements 25, but not actually reached. This is because in order to avoid excessively hard or abrupt course maneuvers, by means of an autopilot-flight controller 27 on board the defensive airborne body 14, there is always determined in time and flown through before reaching a travel point 24, a flight-dynamically expedient transition curve 28, which herein tangents the two subsequently following rough trajectory elements. 25.

Within this superordinated flight controller 27, which implements the function of an autopilot, there is further constructed a simulation computer 29 on board the airborne body 14, device 19 of the defensive airborne body 14 (in view of a sufficient approach to a flying object 12) detects the motion parameters thereof relative to its own respective instantaneous location; for example, through a passive infrared sensor, in the simulation computer 29 in a time-lapse or staggered procedure; in effect, there is computed in the system simulation; accelerated, for example, by a thousandfold in time (considering the instantaneous relative motion between the defensive airborne body 14 and the flying object 12 which is to be warded-off, as well as the specified path or travel points 24 of the nominal trajectory), the extent in which the approach which is actually attainable under the specified conditions deviates spatially and in time from the mathematically predetermined, ideal collision point K(t0).

Figure 2:
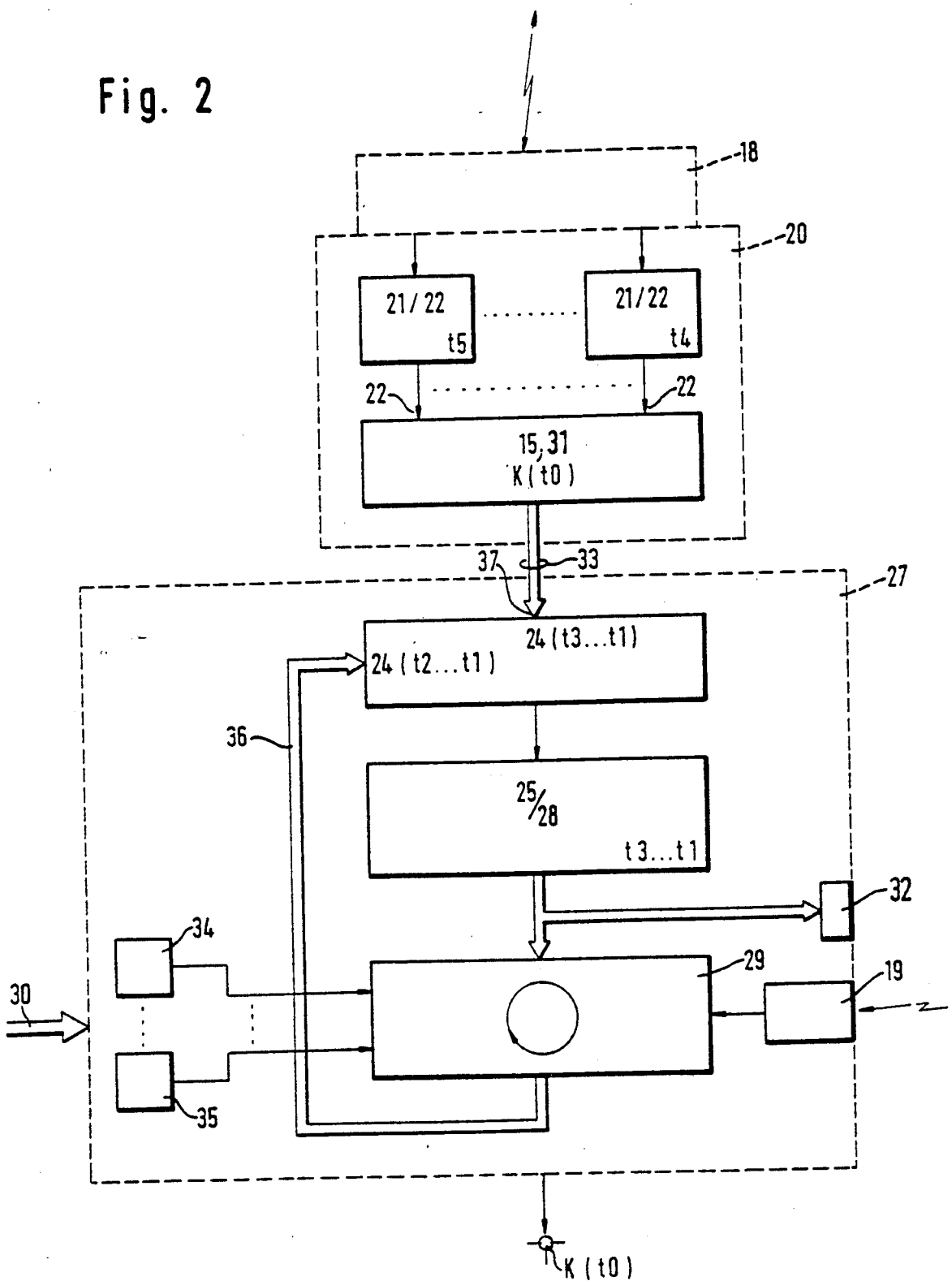
FIG. 2 illustrates a simplified block circuit diagram for the trajectory guidance-control cycle in the defensive airborne body.

Such deviations result in particular from disruptive environmental influences 30, such as wind forces, which cause a deviation of the actual motion from the mathematically determined trajectories, but also from various maneuvers of the oncoming flying object 12 and from thrust irregularities encountered in the mode of operation of the propulsion mechanism 23 of the airborne body. Belonging to these influences 30 are also actual deviations of the object 12 from a computed ballistic trajectory 15 caused by non-linear retardations which result from severe atmospheric friction losses. The warhead 17 of the defensive airborne body 14, however, only allows for an adequate expected effect in the target when it does not pass the flying object at too great a distance and at an excessively large aspect angle; in effect, when the movement in the entry of the defensive airborne body 14 into the approaching trajectory 15 (directed oppositely thereto) is carried out prior to entering the optimum collision time point t0 through the base of an acutely angled entry cone which is specified as the trajectory guidance-limiting value; hereinafter designated for illustration as the swing-in or fan-out funnel 31; whose tip lies in front of or possibly even within the collision point K(t0) which is to be actually expected. Moreover, the specifying of the fan-out funnel 31; or essentially its aperture angle, is also determined by which target acquisition angle is possessed by the on-board tracking device 19. An individual specification of the momentarily suitable funnel 31 at the input of the nominal trajectory data 37 (FIG. 2) is therefore expedient.

In order to simplify the overview, in FIG. 1 a deviation of the actual from the previously specified ideal collision point K(t0) is additionally not taken into consideration in the drawings.

When the time-lapse simulation of the actual trajectory of the defensive airborne body 14 in relation to the actual approach trajectory 15; in essence, the extrapolation of the mutual sequences of movement, should result in that the swing-in funnel 31 can be missed by the defensive airborne body 14; in other words the (timewise and postionally close) approach to the flying object 12 is not assured as required for effectiveness from the standpoint of the ammunition technology there is thereafter computed on board the defensive airborne body 14 first of all in the manner of the time-lapse simulation as to how the approach conditions would change if specific changes were effected during the flying through of the previously specified rough trajectory elements 25. Such changes are located particularly in the variation of the radii of curvature of the transition curves 28 between the specified rough trajectory elements 25; however, if necessary, also in a shifting of specified, momentary and future envisioned trajectory points 24 (in effect, changes in the spatial orientation of the rough trajectory elements 25). The goal of the simulation, notwithstanding the uninfluenceable thrust of the propulsion mechanism 23 of the airborne body and the uninfluenceable motion of the flying object 12, with the simulation result to be able to initially enter at the expedient point in time into the spatial swing-in funnel 31, such that at a time point t0, possibly spatially shifted relative to the original assumption to reach as closely as possible to the real collision point K. The specifications for the conditions of flight of a "good" simulation result are then specified as real reference values to the flight controller 27, in order to fly with corrections relative to the previous (nominal trajectory) specifications.

Accordingly, it is essential that on board the defensive airborne body 14; with consideration being view to the real approach conditions which are obtained by means of the target-tracking device 19, there are simulated in a time-staggered mode deviations from the nominal trajectory which was originally determined in the navigational computer until still prospective travel or trajectory points 24' and/or transition curves 28' have been found, and which promise a time-optimized entry into the base of the swing-in or transient funnel sector 31. Only then is there carried out any actual influencing over the instantaneous movement of the defensive airborne body 14 through a suitable control of its adjusting elements 32; for instance, such as in the form of control rudders or transverse thrust nozzles. As a result, there is avoided the danger of temporary inexpedient deviations from the prescribed nominal trajectory, and thereby the danger in the requirement for hard or sudden course maneuvers during the final phase in the approach to the flying object 12.

As an example for such a corrective measure, there is shown in FIG. 1 an intensely forwardly displaced trajectory point 24' (t1) which; however, in order to avoid excessive mechanical stresses, is passed through with extremely gentle transition curves 28' (t1), in order to swing in the most possibly acutely angled manner, into the trajectory tangent 26(t0) through the real collision point K(t0).

A nominal-trajectory change of that kind of severity, as illustrated in the drawing by the extremely displaced rough trajectory element 25', is in actual practice always only necessary when the target-tracking device 19 for the final-phase collision guidance of the defensive airborne body 14, after a certain specified mission period, should by means of its relatively narrow aperture angle still not have acquired the object 12 which is to be intercepted. This situation signifies the presence of extreme unforeseen delays in the entry of the object 12 into the interception region; in effect, points to a considerably more intensely curved (steeper) diving trajectory 15 than could be precomputed on the ground at a large acquisition range. The defensive airborne body 14 is thereby accordingly imparted a shift in the direction towards the expected trajectory 15 (or even therebeyond), in the expectation that its target-tracking device 19 will thereafter at a steeper climb along the curve 28' still be able to acquire the object 12.

In the exemplary illustration pursuant to FIG. 1, provision is made, depending upon circumstance, to orient the launching position 13 through a data connection 33, and in any event, to specify for the defensive airborne body 14 immediately prior to its launch its provisional nominal trajectory; in effect, the optimum trajectory points 24 in relation to the approach trajectory 16 which is extrapolated by the external navigational computer 20. Basically, there can additionally be provided a wireless information transmission to the launched defensive airborne body 14, in order not to need to detect the motion components of the real relative approach between the flying object 12 and defensive airborne body 14 solely with the on-board elements of the target-tracking device 19, but also in this respect to be able to render available more rapidly a grater amount of data for the time-lapsed trajectory simulation (and the variation in the nominal specified trajectory derived therefrom).

In any case, the on-board flight controller 27 is equipped, besides the preferably passively functioning target-tracking device 19 (FIG. 2), with the customary information transmitters 34 and receivers 35 (such as accelerometer, gyroscope and mission-time clock) for ascertaining the dynamic behavior of the real defensive airborne body 14 and for interference magnitudes which must be considered with regard to the control technology, caused by environmental influences 30; in order to be able to determine, by means of the simulation computer 29 operating in time-discrete manner; in essence in a scanning operation, in time-lapse and iterative manner, the optimum reference values for the functionally superordinated function of the flight controller 27, which during the course of the mission, replace as corrective data 36, the nominal data 37 extrapolated originally, at the launching point in time t3, for effecting the control of the adjusting elements.

As a result, at an arbitrary actual point in time, on the approach path (25-28) there are compensated in all instances (measured) deviations from the originally specified nominal trajectory and if known through further measurement of the approach trajectory 15 of the target object 12, also variations of the collision point K(t0), primarily by adaptation of the nominal trajectory still located ahead thereof, taken into consideration physical limitations and defined end conditions (more especially the nominal flight time); and not generally compensated for through a constant interference compensation related to a singly determined reference trajectory.

I claim:

1. A method for the warding-off of an airborne object approaching a target area through a guidable defensive airborne body intercepting said airborne objects, comprising the steps of:
    (a) determining and mathematically extrapolating an approach trajectory of the airborne object to said target area through the intermediary of a navigational computer when said object is still at an extremely considerable distance from said target area;
    (b) determining a spatially and timewise optimized collision point between said defensive airborne body and said airborne object upon launching said airborne body from the vicinity of said target area, determining ahead of said collision point an acutely-angled transient funnel sector about approach trajectory of said airborne object which is tangent therewith at the collision point between said airborne object and said airborne body, and transmitting data thereto and at points along the path for a nominal trajectory for said airborne body for homing into the base of said transient funnel sector prior to the launching of said defensive airborne body;
    (c) computing in a simulation computer in a time-staggered sequence on board said defensive airborne body subsequent to launching thereof with consideration of a dynamic model of the airborne body which has the nominal trajectory momentarily specified to a superordinated flight controller and position-finding information obtained on board the defensive airborne body relative to an airborne object acquired thereby, a four-dimensional point in space and time of the closest approach by the defensive airborne body which is to be actually expected from the actual conditions of motion to the airborne object which is to be intercepted;
    (d) iteratively repeating said computation with consideration of the actual relative positional data of the defensive airborne body to the airborne object which is to be intercepted, until computed modified trajectory data indicate expectations of a sufficiently close actual approach to the airborne object in a specified relative orientation of the defensive airborne body;

(e) varying in the flight controller the guidance inputs for the originally preset and assumed nominal trajectory pursuant to the extent of such corrected trajectory;

(f) and repeating the time-staggered iterative preliminary computation of the actually expected collision conditions with the changed trajectory data and the actual relative position-finding information, so as to correlate such data and information with the inputs to the flight controller.

2. A method as claimed in claim 1, wherein the inputs for an optimized result of the time-staggered discrete model iterative computation which deviate from flight attitude values of a specified nominal trajectory for said airborne body are transmitted to a superordinated autopilot flight controller as parameters for a modified trajectory.

3. A method as claimed in claim 1, wherein said defensive airborne body in the absence of a guidable propulsion mechanism, has the time criteria of the four-dimensional navigation influenced through selectively curtailed or extended transitional arcs extending between rough trajectory elements defined by points along the trajectory of said airborne body.

4. A method as claimed in claim 1, wherein an intervention into the instantaneous actuation of airborne-body setting elements is undertaken for modifying the trajectory thereof only when the time-staggered iterative model computation has provided transitional curves and trajectory points for an improved approach to the actually expected airborne object.

5. A method as claimed in claim 1, wherein the nominal trajectory of the airborne body is specified such that the course maneuvers which are expected along transitional curves remain within limits of maximum acceleration stresses assumed to act on the defensive airborne body.

6. A method as claimed in claim 1, wherein there is effected a displacement during the final phases of the specified nominal trajectory of the defensive airborne body in a direction towards a physically possible deviation of the airborne object from the precomputed approach trajectory thereof, when a target-tracking device on board the defensive airborne body, after passage of a specified mission period of time along the nominal trajectory has failed to acquire the airborne object.

7. A method as claimed in claim 1, wherein a fragmentation warhead of the defensive airborne body is triggered at the point in the trajectory of the airborne body at the minimum specified distance of approach to the airborne object.

* * * * *